(12) United States Patent
Conway

(10) Patent No.: US 6,249,395 B1
(45) Date of Patent: Jun. 19, 2001

(54) DATA RECOVERY SYSTEM PARTICULARLY FOR SYSTEMS UTILIZING PARTIAL RESPONSE MAXIMUM LIKELIHOOD DETECTION

(75) Inventor: Thomas Conway, Boulder, CO (US)

(73) Assignee: STMicroelectronics, N.V. (NL)

( * ) Notice: Subject to any disclaimer, the term of this patent is extended or adjusted under 35 U.S.C. 154(b) by 0 days.

(21) Appl. No.: 09/207,434

(22) Filed: Dec. 8, 1998

(51) Int. Cl.[7] .................................................. G11B 5/09
(52) U.S. Cl. ...................................... 360/51; 360/65
(58) Field of Search ..................... 360/51, 65; 369/59; 375/346, 355

(56) References Cited

U.S. PATENT DOCUMENTS 5,220,466 * 6/1993 Coker et al. ........................ 360/46

OTHER PUBLICATIONS

"A CMOS 260Mbps Read Channel with EPRML Performance", Thomas Conway et al., Analog Devices, pp. 1–4. (Date unavailable).*

* cited by examiner

Primary Examiner—Alan T. Faber
(74) Attorney, Agent, or Firm—Theodore E. Galanthay; Lisa K. Jorgenson; James H. Morris

(57) ABSTRACT

A data recovery system wherein the data is represented by a sequence of preamble pulses having a predetermined sequence followed by data pulses. An analog to digital converter converts samples of the preamble pulses and the data pulses into corresponding digital words in response to clock pulses fed to a clock input of the converter. A pair of feedback loops is coupled to an output of the analog to digital converter to produce the clock pulses for the converter; a first one during a data recovery mode and a second one during a preceding preamble acquisition mode.

14 Claims, 8 Drawing Sheets

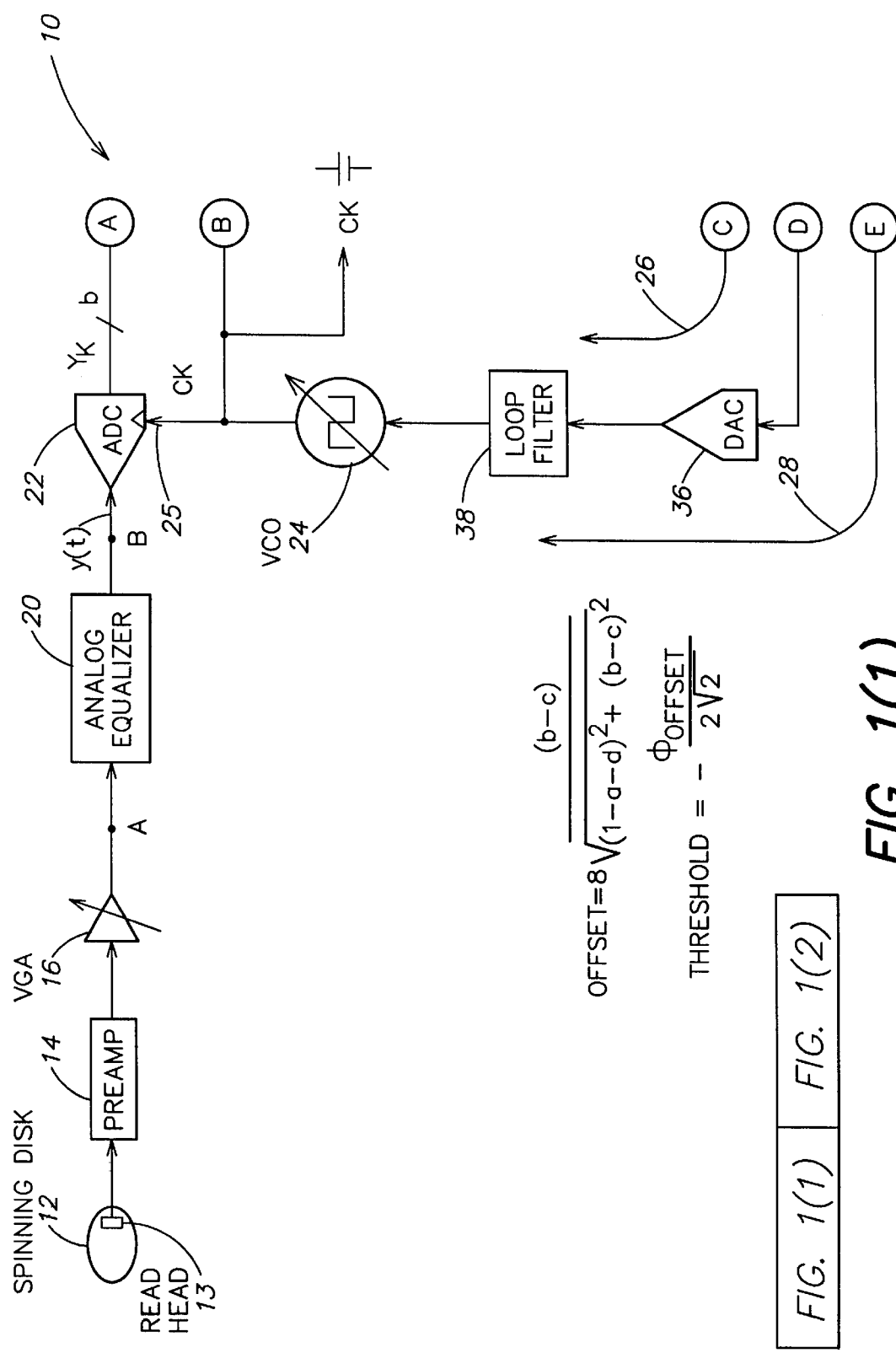

ISOLATED PULSE WAVEFORM

DATA RECOVERY SYSTEM PARTICULARLY FOR SYSTEMS UTILIZING PARTIAL RESPONSE MAXIMUM LIKELIHOOD DETECTION

BACKGROUND OF THE INVENTION

This invention relates generally to data recovery systems and more particularly to systems utilizing partial response maximum-likelihood (PRML) detection.

Data recovery systems are used in a variety of applications. In one application, such system is used to recover (i.e., read) data stored on a magnetic disk of the type used as hard drives in computer data storage systems. In one type of such data storage system, a predetermined preamble pattern is written onto the magnetic disk before the start of any block of data to be stored. The preamble pattern is used during the read operation to acquire initial gain, frequency and phase lock to the data read from the disk. Thus, when data is read from the disk, the preamble is used by the read channel during a preamble recovery mode to obtain clock (i.e., sampling or timing) pulses for a subsequent data recovery mode.

The data read from the magnetic disk is typically passed through an analog equalization filter prior to passing to succeeding stages of the data recovery system. The analog equalization filter is configured to shape the sequence of preamble pulses and data pulses into pulses having a predetermined waveform characteristic. The analog equalization filter has non-linear change in phase as a function of frequency characteristic. The analog equalization filter produces pulses that are fed to an analog-to-digital converter. The analog to digital converter converts samples of the shaped pulses into corresponding digital words in response to the clock pulses (i.e., sampling pulses) fed to a clock input of the converter. In one arrangement, such as in U.S. Pat. No. 5,220,466, a pair of feedback loops is coupled between an output of the analog to digital converter and the clock pulse input to such converter. A first one of the feedback loops is used during the data recovery mode and includes a digital filter fed by the digital filter words produced by the analog to digital converter. The digital filter has coefficients selected to compensate for the non-linear change in the magnitude and phase as a function of frequency characteristic of the equalization filter. A tracking gain and phase control section is fed by the digital filter and is responsive to the digital words representative of the data pulses for producing the clock pulses for the analog to digital converter during the data recovery mode.

However, in order to rapidly synchronize the clock pulse frequency and phase to the preamble pulse frequency $f_p$ and phase during the preamble acquisition mode, the digital filter is by-passed (i.e., the first feedback loop is disabled) and a second one of the pair of feedback loops is used. That is, the second feedback loop is used during the preamble acquisition phase to lock onto the frequency and phase of the preamble for subsequent switch-over to the first feedback loop. The second feedback loop includes an acquisition gain and timing control section responsive to the digital words representative of the preamble pulses for producing clock pulses for the converter which are synchronized (i.e., locked) in frequency and phase to the preamble pulses.

The use of an asymmetric digital filter can improve data recovery performance. That is, because the analog equalization filter may have a non-linear phase vs. frequency characteristic, an asymmetric digital filter may provide better compensation. However, when switching from the preamble acquisition mode to the data recovery mode, an undesirable a phase step change may occur in the system.

SUMMARY OF THE INVENTION

In accordance with the present invention, a data recovery system is provided. The data is represented by a sequence of preamble pulses having a predetermined sequence followed by data pulses. An analog to digital converter is provided to convert samples of the preamble pulses and the data pulses into corresponding digital words in response to clock pulses fed to a clock input of the converter. A selected one of a pair of feedback loops is coupled to an output of the analog to digital converter to produce the clock pulses for the converter; a first one during a data recovery mode and a second one during a preceding preamble acquisition mode. The first one of the feedback loops includes an asymmetric digital filter fed by the digital words produced by the analog to digital filter. The first one of the feedback loops produces the clock pulses during a data recovery mode in accordance with a first phase error signal. The first phase error signal is related to a phase difference between the clock pulses to the converter and data pulses produced by the asymmetric digital filter. The first feedback loop adjusts the phase of the clock pulses to the converter in accordance with the first phase error signal to produce a predetermined phase difference between the converted data pulses and the clock pulses. The second feedback loop by-passes the asymmetric digital filter during a preceding preamble acquisition mode and produces the clock pulses to the converter during the preamble acquisition mode. The second feedback loop produces a second phase error signal related to a phase difference between the clock pulses to the converter and converted preamble pulses produced by the analog to digital converter and a predetermined phase difference, or offset phase, between the converted preamble pulses and the clock pulses. The offset is related to a phase shift produced by the asymmetric digital filter.

With such an arrangement, because the first and second phase error signals produced by the pair of feedback loops are substantially equal, a seamless switching from the preamble acquisition mode to the data recovery mode is accomplished.

In accordance with another feature of the invention, a data recovery system is provided wherein the data recovered from such system is represented by a sequence of data pulses. The system includes an analog equalization filter fed by a predetermined sequence of preamble pulses during a preamble acquisition mode followed by the sequence of the data pulses during a subsequent data recovery mode. The analog equalization filter is configured to shape the sequence of preamble pulses and data pulses into pulses having a predetermined waveform characteristic. The analog equalization filter may have a non-linear change in phase as a function of frequency characteristic. The data recovery system includes an analog to digital converter fed by the analog equalization filter for converting samples of the shaped pulses fed thereto into corresponding digital words in response to clock pulses fed to a clock input of the converter. The system also includes a pair of feedback loops. A first one of the loops is coupled between an output of the analog to digital converter and the clock pulse input to such converter through an asymmetric digital filter during a data recovery mode and a second one of the loops is coupled between the output of the analog to digital converter and the clock pulse input to such converter with the asymmetric digital filter by-passed, during a preceding preamble recovery mode. The asymmetric digital filter has coefficients selected to compensate for the non-linear change in phase as a function of frequency characteristic of the equalization filter. The first feedback loop includes a data phase error calculator section fed by the asymmetric digital filter. The data phase error calculator section is responsive to the digital words fed thereto by the asymmetric digital filter and produces a data recovery mode phase error control signal. The second one of the feedback loops includes a preamble phase error calculator section responsive to the digital words produced by the analog to digital converter and representative of the preamble pulses and an offset phase shift, determined in accordance with the coefficients of the asymmetric digital filter, for producing a preamble acquisition mode phase error control signal. The preamble acquisition mode phase error control signal is used to control the frequency and phase of the clock pulses to the converter during the preamble acquisition mode and the data recovery mode phase error control signal is used to control the frequency and phase of the clock pulses to the converter during the subsequent data recovery mode.

With such an arrangement, because the phase shift provided by the asymmetric digital filter is determined a priori and is used as the phase shift offset by the preamble phase error calculator section during the preamble acquisition mode, there is a seamless switching from the preamble acquisition mode to the data recovery mode. That is, during steady-sate, the preamble acquisition mode phase error control signal adjusts the clock pulses to the converter so that they track the preamble frequency and have a proper phase relationship the preamble. Thus, at the time the system switches to the data recovery mode, the preamble acquisition mode phase error control, having as a component thereof the phase through the asymmetric digital filter, will be substantially the same as the data recovery mode phase error control signal resulting on a seamless transition between the modes.

BRIEF DESCRIPTION OF THE DRAWING

Other features of the invention, as well as the invention itself, will become more readily apparent from the following detailed description taken together with the accompanying drawings, in which.

DESCRIPTION OF THE PREFERRED EMBODIMENTS

Figure 1:
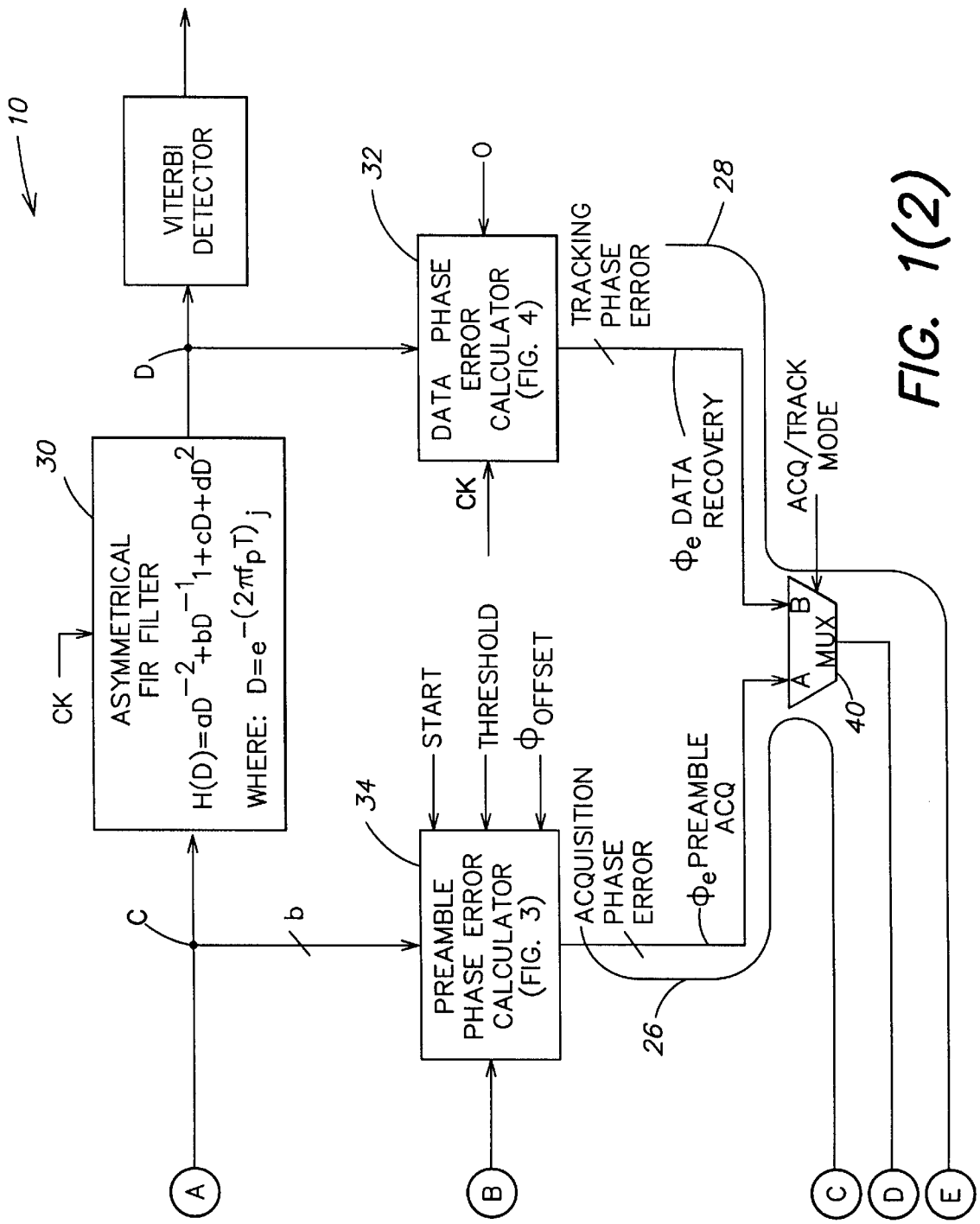
FIGS. 1(1) and 1(2) are block diagrams of a data recovery system according to the invention.
Figure 1A:
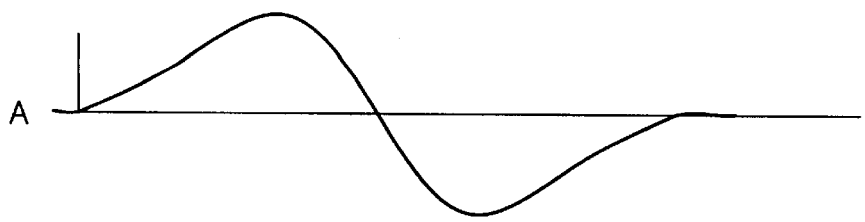
FIGS. 1A–1D are waveforms of signals produced by the data recovery system of FIG. 1 at various points in such system.

Referring now to FIGS. 1(1) and 1(2), block diagrams of a data recovery system 10 is shown. The system 10 is used to recover data that is stored on a magnetic disk 12. The magnetic disk 12 rotates relative to a magnetic field detecting head 13 and the data stored on the disk 12 is converted by the head 13 into pulses. The data are read from the disk 12 and pass through a preamplifier 14 and variable gain amplifier 16. An exemplary bit of data (i.e., at point A) will have a waveform, as shown in FIG. 1A, after passing through the preamplifier 14 and variable gain amplifier 16. (It should be understood that, in practice, as with a class 4 partial response (PR4) data recovery system, more that one bit of binary data is read from the disk 12 within the time duration of the pulse produced from a single bit).

Figure 1B:
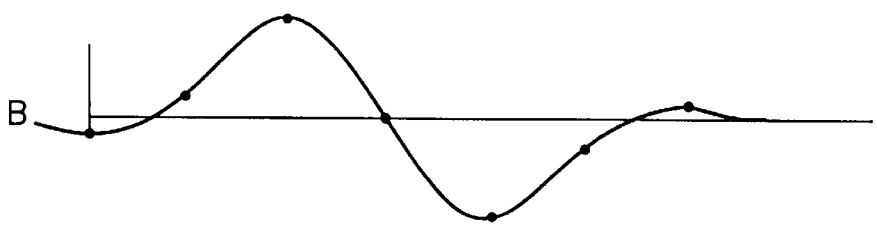

The output of the variable gain amplifier 16 is fed to an analog equalization filter 20. The analog equalization filter 20 is configured to shape the sequence of data pulses into pulses having a predetermined waveform characteristic. The analog equalization filter 20 has a non-linear change in phase as a function of frequency characteristic. The output of the analog equalization filter 20 (i.e., point B) for the exemplary isolated bit shown in FIG. 1A is shown in FIG. 1B.

The output of the analog equalization filter 20 is fed to an analog to digital converter 22. The analog to digital converter 22 is fed by the shaped pulses produced by the analog equalization filter 20 and converts samples of the shaped pulses into corresponding digital words in response to clock pulses (CK) fed to a clock input 24 of the converter 22. In order to account for variations in the spin rate of the disk 12 relative to the head 13, for example, when a block of data is recorded onto the disk 12 during a write operation, the block of data is preceded with a preamble. The preamble is a predetermined sequence of bits written at a predetermined fixed rate, or preamble frequency, $f_p$, and may be represented as:

$$y(t) = 2\sqrt{2}\ \text{SIN} \frac{2\pi t}{4T}$$

where t is time.

Figure 1C:
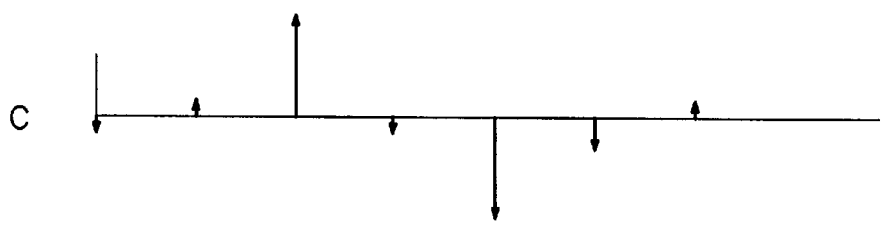
Figure 2A:
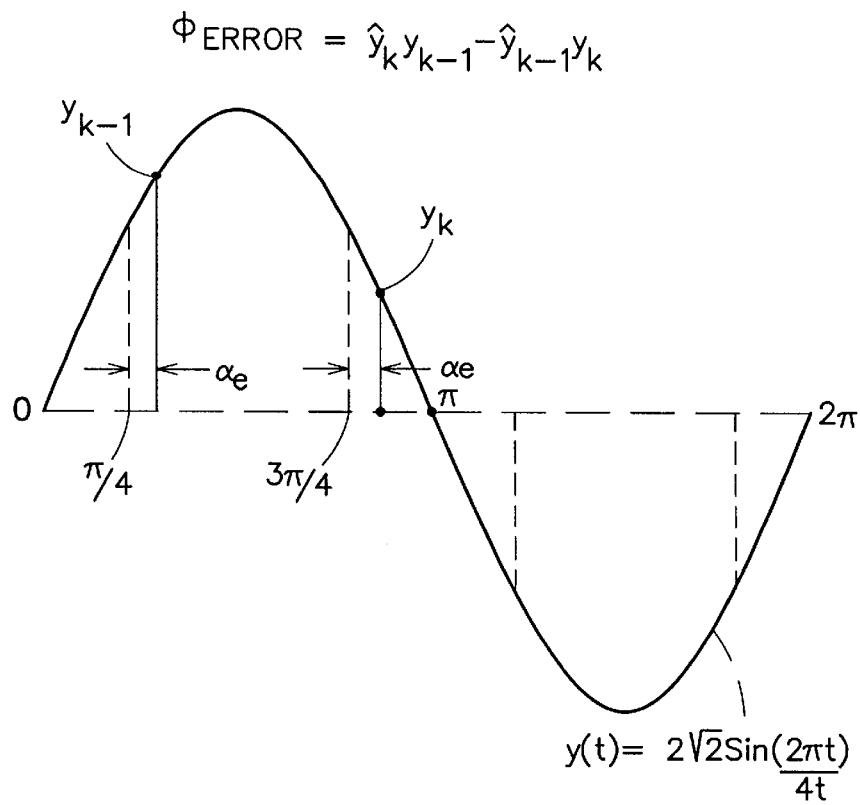
FIGS. 2A and 2B are waveforms showing samples taken by the data recovery system of FIG. 1, such samples being used, inter alia, to produce phase control signals in the system of FIG. 1.
Figure 2B:
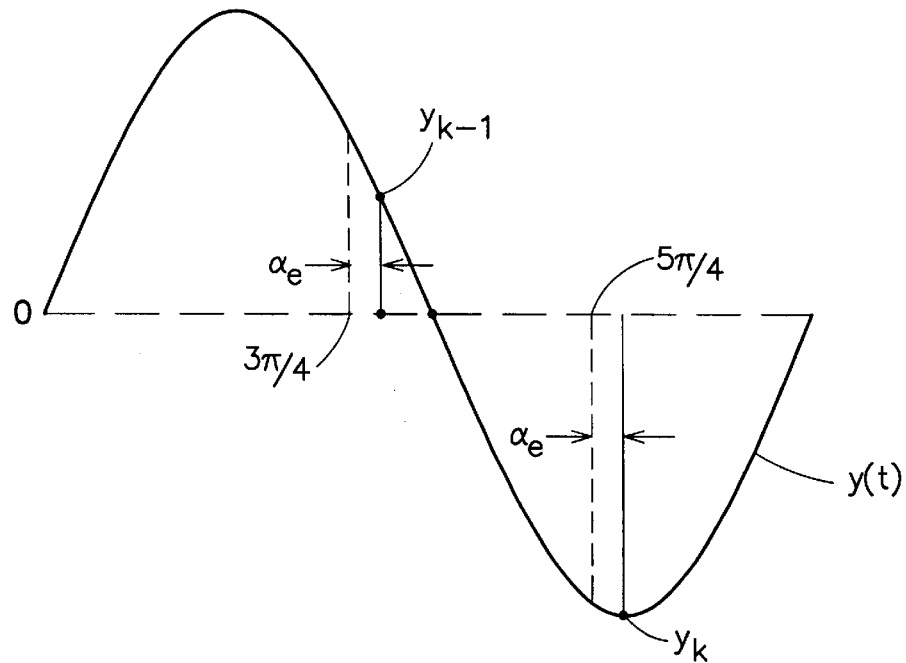

During a read operation, the preamble is used by the data recovery system 10 to lock the frequency of the clock pulses CK fed to the analog to digital converter 22, to the preamble frequency, $f_p$, and also to lock the phase of the clock pulses CK to a phase of the preamble frequency, $f_p$. The output samples of the analog to digital converter 22 (i.e., at point C) for the pulse shown in FIG. 1B, is shown in FIG. 1C. Here, it is desired to have four sample of each preamble cycle or period, i.e., 4T. Thus, ideally the clock pulses (CK) have a frequency of 1/T, and have a phase difference of $n\pi/4$, where n is an odd integer, as shown in FIGS. 2A and 2B. As shown in FIG. 2A, and as noted above, four samples are taken for each period, 4T, of the preamble. Further, with ideal sampling, samples to are taken at (i.e., clock pulses CK are produced at) phase angles of $\pi/4$ and $3\pi/4$ radians. Assuming the preamble is represented as:

$$2\sqrt{2}\ \text{Sin}(2\Pi t/4T)$$

(where t is time) and assuming a phase sampling error $\alpha_e$, where $-\pi/4 < \alpha_e < \pi/4$ (i.e., both samples are positive), an phase error control signal, $\phi_e$, may be expressed by the following equation:

$$\phi_e = \hat{y}_k y_{k-1} - \hat{y}_{k-1} y_k$$

where: $y_k$ is the kth sample produced by the analog to digital converter 22;

$y_{k-1}$ is the (k−1)th sample produced by the analog to digital converter 22;

$\hat{y}_k$ is 2 times the polarity of the kth sample produced by the analog to digital converter 22 relative to a reference, or threshold level, THRESHOLD, nominally zero;

$\hat{y}_{k-1}$ is 2 times the polarity of the (k−1)th sample produced by the analog to digital converter 22 relative to the reference, or threshold level, THRESHOLD, nominally zero.

This phase error control signal, $\phi_e$, is used as a feedback control signal to control a voltage for a voltage controlled oscillator (VCO), such as VCO 24 the output of which being used to produce the clock pulses CK for the analog to digital converter 22.

It is noted that when $-\pi/4 < \alpha_e < \pi/4$ (i.e., both samples are positive), $\hat{y}_{k+1} = +2$ and $\hat{y}_k = +2$, as shown in FIG. 2B, and the phase error control signal may be represented as:

$$\phi_e = 8 \sin(\alpha_e).$$

Further, as the phase sampling error signal, $\alpha_e$, increases, as shown in FIG. 2, here, $y_{k-1} > 0$, $\hat{y}_{k-1} = +2$ and $y_k < 0$, $\hat{y}_k = -2$, where: $-\pi/4 < \alpha_e < \pi/4$. Here again, $\phi_e = 8 \sin(\alpha_e)$.

As noted above, the phase error control signal, $\phi_e$, is used to synchronize the frequency, $f_p$, and phase of, the preamble to the clock pulses CK at the clock input 24 to the analog to digital converter 22 (i.e., the sampling pulses).

Figure 1D:
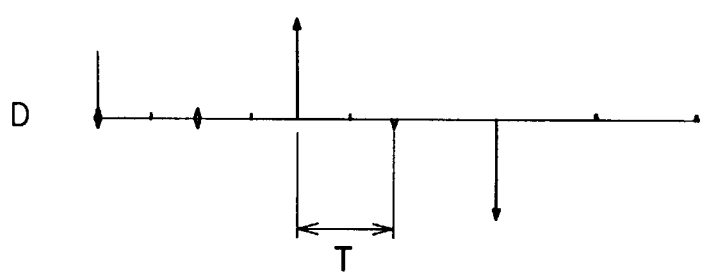
Figure 4:
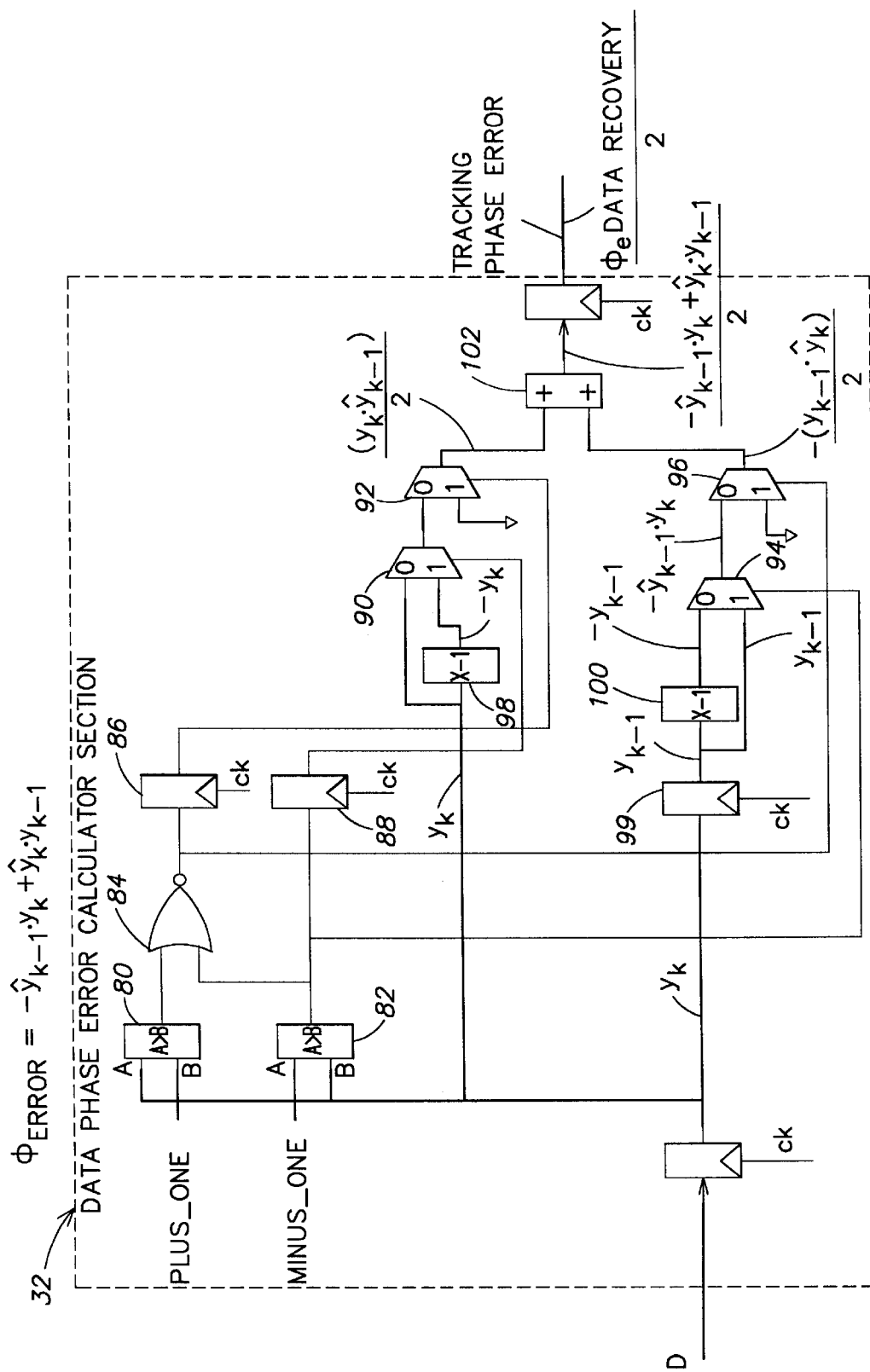
FIG. 4 is a block diagram of a data phase error calculator section used in the system of FIG. 1 during a subsequent data recovery mode.

The analog to digital converter 22 is disposed in a pair of feedback loops 26, 28. A first one of the feedback loops 26, 28, here feedback loop 28, is used during the data recovery mode and a second one of the feedback loops, here loop 26, is used during a preceding preamble recovery mode. Each one of the feedback loops 26, 28 is, in the appropriate mode, coupled between an output of the analog to digital converter 22 (i.e., point C) and the clock pulse input 25 to such converter 22. (The output of converter 22 for the pulse shown in FIG. 1A is shown in FIG. 1C.) The first one of the feedback loop 26 includes an asymmetric digital filter 30 fed by the digital words produced by the analog to digital filter. The samples produced, by the asymmetric digital filter 30 (i.e., at point D) for the exemplary isolated single bit shown in FIG. 1A is shown in FIG. 1D. The first feedback loop 28 includes a data phase error calculation section 32, shown in FIG. 4, which produces the data recovery mode phase error control signal, $\phi_{e\ DATA\ RECOVERY}$, during the data recovery mode in accordance with:

$$\phi_{e\ DATA\ RECOVERY} = \hat{y}_k y_{k-1} - \hat{y}_{k-1} y_k$$

The data recovery mode phase error control signal, $\phi_{e\ DATA\ RECOVERY}$ is related to a phase difference between the clock pulses CK and digital pulses produced by the asymmetric digital filter 30. As noted above, exemplary digital pulses for the pulse shown in FIG. 1A are shown in FIG. 1D.

Figure 3:
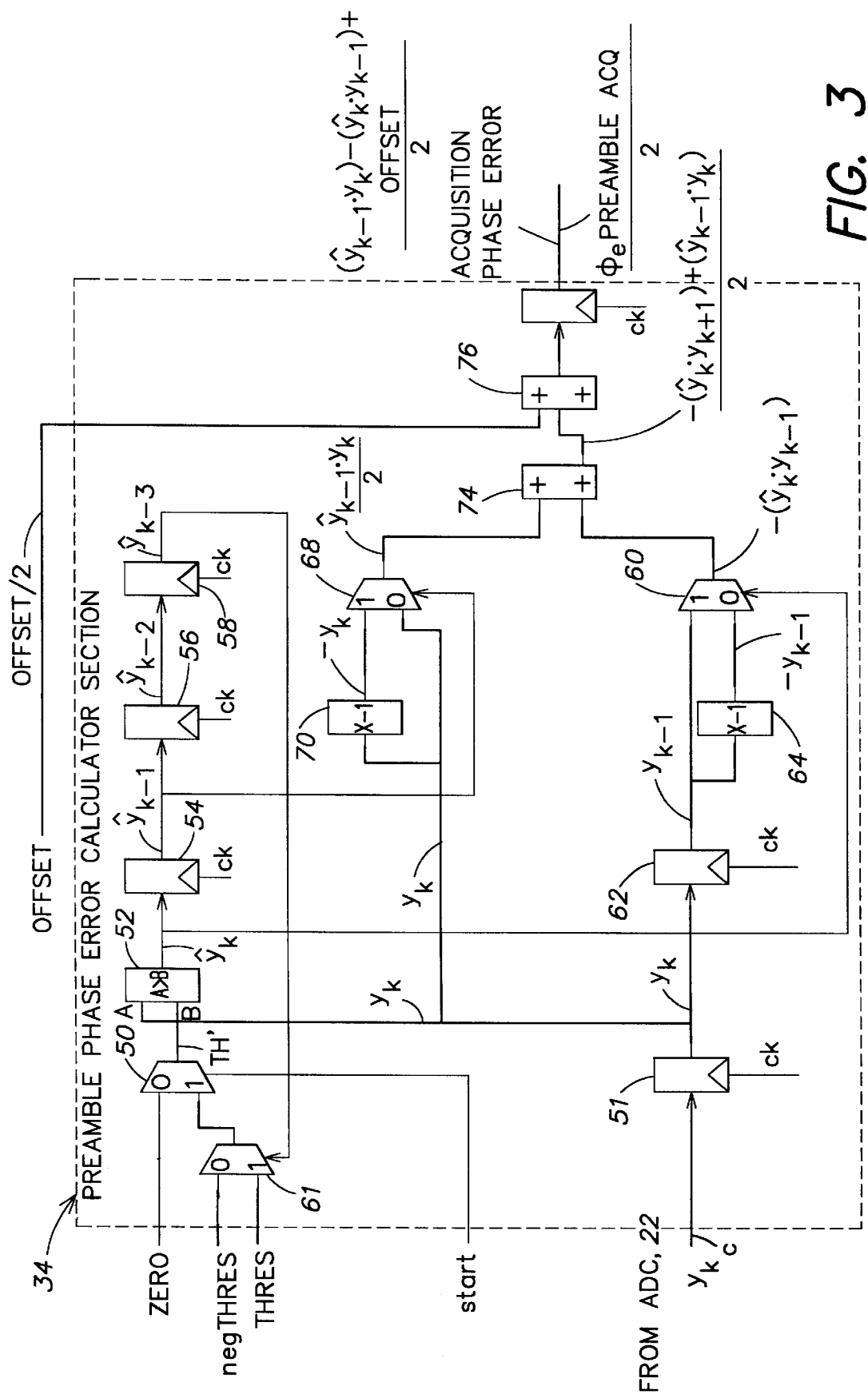
FIG. 3 is a block diagram of a preamble phase error calculator section used in the system of FIG. 1 during a preamble acquisition mode.

More particularly, the asymmetric digital filter 30 is here a finite impulse response (FIR) filter and has coefficients selected to compensate for the non-linear change in phase as a function of frequency characteristic of the analog equalization filter 20. The frequency response of the asymmetric digital filter 30, here a five coefficient FIR filter, may, at the preamble frequency, $f_p$, be represented as:

$$H(D) = aD^{-2} + bD^{-1} + 1 + cD + dD^2$$

where: $D = e^{-j2\pi fT}$; and a, b, c and d are the coefficients of the asymmetric digital filter 30. It is noted that with the five coefficients, asymmetric digital filter 30 there are four coefficients available to shape the impulse response whereas if the filter were symmetric there would be only two coefficients since a=d and b=c for this purpose. Thus, a symmetric filter has reduced flexibility compared to the asymmetric digital filter 30. Unfortunately, the use of the asymmetric digital filter 30 adds a phase shift (i.e., PHASE) to the signals passing through it. In order to compensate for this PHASE, an equivalent phase shift, or OFFSET, is added to the second feedback loop 26 which is used during the preceding preamble acquisition mode. That is, during the preamble acquisition mode, a preamble mode phase error signal, $\phi_{e\ PREAMBLE\ ACQ}$, is determined by a preamble phase error calculator section 34, shown in FIG. 3, which may be represented by:

$$\phi_{e\ PREAMBLE\ ACQ.} = \hat{y}_k y_{k-1} - \hat{y}_{k-1} y_k + \frac{OFFSET}{2}$$

The preamble mode phase error signal, $\phi_{e\ PREAMBLE\ ACQ.}$ is fed, via a digital to analog converter 36 and loop filter 38, to the VCO 24. (The loop filter 38 is here a lead-lag filter configured to stabilize the feedback loops). The phase shift OFFSET is related to the non-linear phase shift PHASE in the asymmetric digital filter 30.

During steady-state of the preamble acquisition mode, the preamble mode phase error signal, $\phi_{e\ PREAMBLE\ ACQ.}$ will cause the VCO 24 to produce the preamble frequency, $f_p$, with a phase, relative to the phase of the preamble, such that $\alpha_e = 0$. Thus, at the time the system switches to the data recovery mode, $\phi_{e\ DATA\ RECOVERY}$ will be substantially equal to $\phi_{e\ PREAMBLE\ ACQ.}$, even through there is a phase shift through the asymmetric digital filter 30. That is, because an equivalent phase shift, i.e., OFFSET, has been added to the computation of $\phi_e$, at the time the system switches to the data recovery mode, $\phi_{e\ DATA\ RECOVERY}$ will be substantially equal to $\phi_{e\ PREAMBLE\ ACQ.}$ and a seamless transition results when the system switches from the preamble acquisition mode to the data recovery mode. To put is still another way, with such an arrangement, because the preamble mode phase error signal, $\phi_{e\ PREAMBLE\ ACQ.}$ and the data recovery phase error signal, $\phi_{e\ DATA\ RECOVERY}$ produced by the pair of feedback loops are substantially equal at the time of switch-over, a seamless switching from the preamble acquisition mode to the data recovery mode is accomplished.

More particularly, the during the preamble acquisition mode, frequency of the preamble, $f_p$, may be represented as:

$$f_p = 1/(4T)$$

Therefore, the during preamble acquisition mode, $$D = D_p = e^{-j\pi/2} = -j.$$

Thus, the frequency response of the asymmetric digital filter 30 at the preamble acquisition frequency, $f_p$ is:

$$H_p = (1 - a - d) + j(b - c)$$

Thus, the gain of, and phase shift through, the digital symmetric filter 30 at the preamble acquisition frequency, $f_p$, are:

$$GAIN = \sqrt{(1-a-d)^2 + (b-c)^2}$$

$$PHASE = \tan^{-1}\left(\frac{b-c}{1-a-d}\right)$$

The time shift, $\tau_{FIR}$ through the asymmetric digital filter 30 is:

$\tau_{FIR} = PHASE(4T/2\pi)$, where a cycle of the preamble is 4T. It is also noted that here, $\alpha_e/2\pi = \tau_{FIR}/4T$. Thus, from the above, it is noted that $\phi_e = 8 \sin(2\pi\tau_{FIR}/4T)$, where $-T/2 < \alpha_e < T/2$ and:

$$\tau_{FIR} = TAN^{-1}\frac{(b-c)}{(1-a-d)} 4T/2\pi$$

As noted above, the phase shift offset, OFFSET, is added to the phase error control signal $\phi_e$ used by the second feedback loop 26. Thus, the OFFSET=PHASE, i.e., OFFSET$= -8 \sin(2\pi(-\tau_{FIR})/4T)$ Or, in another form, from above:

OFFSET$= 8 \sin(\pi\tau_{FIR}/2T)$

However, $\tau_{FIR} = TAN^{-1}((b-c/1-a-d))4T/2\pi$. Therefore, because, as noted above, $\tau_{FIR} = \tan^{-1}(b-c/1-a-d)(4T/2\pi)$, $$OFFSET = 8\frac{b-c}{\sqrt{(b-c)^2 + (1-a-d)^2}}$$

In operation, during the preamble acquisition mode, a multiplexer 40 couples the output of the preamble phase error calculator section 34 to the digital to analog converter 36 and de-couples the output of the data recovery error calculator section 32 from the digital to analog converter 36. During the data recovery mode, i.e., after the preamble has been acquired, the multiplexer 40 couples the output of the data recovery phase error calculator section 32 to the digital to analog converter 36 and decouples the output of the preamble phase error calculator section 32 from the digital to analog converter 36.

Consider the effect of the data recovery system 10 with the digital asymmetric filter 30 without addition of the OFFSET to the second feedback loop 26. During the data recovery mode the phase shift through the asymmetric digital filter 30 will be $\tau_{FIR}$, resulting in a phase angle error $\alpha_e$ equal to $-\tau_{FIR}(2\pi/4T)$. The output of the data error calculator section 32 will be $8 \sin(2\pi(-\tau_{FIR})/4T)$. Thus, while the preamble phase error calculator section 34 would, with OFFSET=0, produce a phase error control signal equal to $-8 \sin(2\pi(-\tau_{FIR})/4T)$, when the multiplexer 40 de-couples the second feedback loop 26 from the VCO and couples the first feedback loop 28 to the VCO 24, the voltage coupled to the VCO 24, after passing through the loop filter 38, will jump by $8 \sin(2\pi(-\tau_{FIR})/4T)$ when the system 10 switches from the preamble acquisition mode to the data recovery mode. Here, however, an OFFSET=$8 \sin(2\pi(-\tau_{FIR})/4T)$ is added to the preamble phase error calculation section 34 thereby eliminating such jump.

Figure 5A:
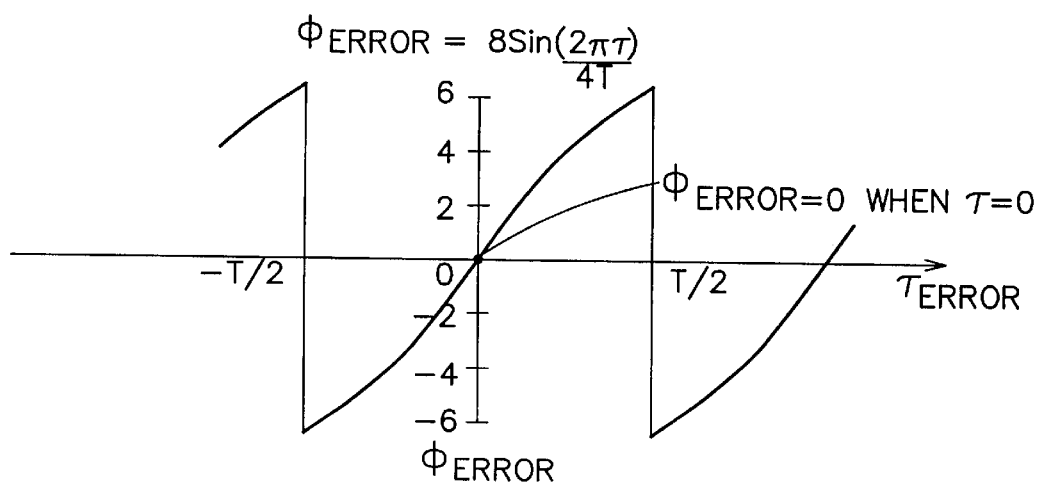
FIG. 5A is waveform useful in understanding the operation of the preamble phase error calculator section of FIG. 3, such waveform showing the relationship between phase error, $\phi_e$, with an OFFSET of zero.

In order that the phase error signal $\phi_e$ be somewhat centered between the values $y_k$ and $y_{k-1}$, a THRESHOLD level is also input to the preamble phase error calculator section 34. Thus, referring to FIG. 5A, the relationship between the difference in phase, or time delay, $\tau_{ERROR}$, between the clock pulses CK and the samples $y_k$ produced at the output of the analog to digital converter 22 may be represented as:

$\phi_e = 8 \sin(2\pi\tau_{ERROR}/4T)$ in the absence of any OFFSET. The second feedback loop operates to drive $\phi_e$ to zero so that $\tau_{ERROR}$ is driven to zero (i.e., so that CK and $y_k$ are phase locked to each other). It is noted that $\phi_e = 8 \sin(2\pi\tau_{ERROR}/4T)$ wraps-around every $\tau_{ERROR} = \pi$. Here, the steady sate operating point $\tau_{ERROR} = 0$ is at the center of a $\tau_{ERROR}$ variation of $\pi$.

Figure 5B:
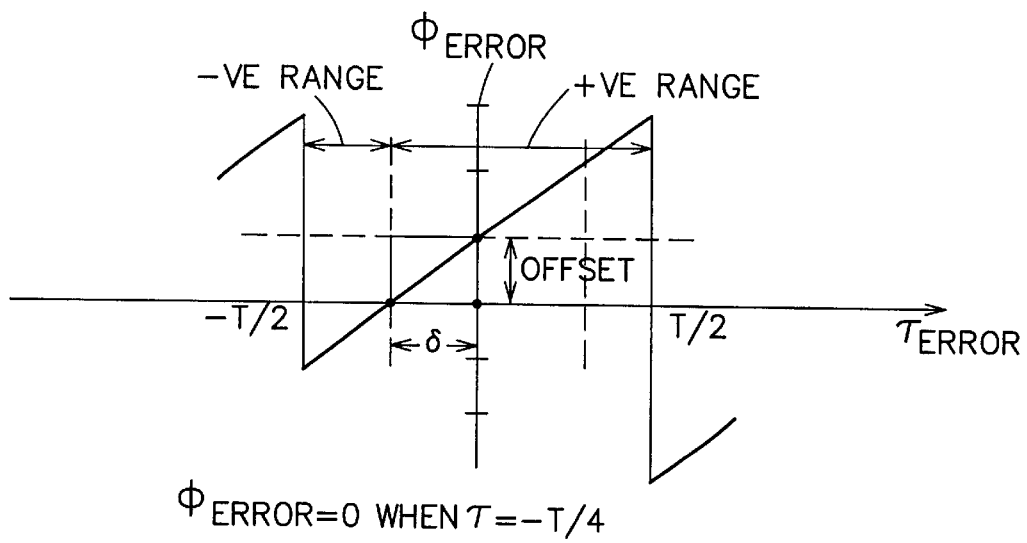
FIG. 5B is waveform useful in understanding the operation of the preamble phase error calculator section of FIG. 3, such waveform showing the relationship between phase error, $\phi_e$, with a non-zero OFFSET.

However, with a non-zero OFFSET, $\phi_e = 8 \sin(2\pi\tau_{ERROR}/4T) + OFFSET$, as shown in FIG. 5B. Thus, the second feedback loop operates to drive $\phi_e$ to zero so that here, $\tau_{ERROR}$ is driven to a non-zero value, here $\delta = \tau_{ERROR}$, as shown in FIG. 5B. Thus, in the steady-state the second feedback loop will operate about $\tau_{ERROR} = \delta$. It is noted that, from FIG. 5B, operating about $\delta$ reduces the symmetrical dynamic range of the second feedback loop. That is, $\delta$ is closer to $-\pi/2$ than to $+\pi/2$ thereby reducing the operating range of the second feedback loop over the range of $\tau_{ERROR}$ from $-\pi/2$ to $\delta$.

In order to have the operating range of the second feedback loop symmetrical about the nominal operating point $\delta$, a non-zero threshold level is used in the preamble phase error calculator 34. That is, it is noted that the wrap-around occurs when $y_k$ and $y_{k+1}$ have different polarities relative to the threshold level, THRESHOLD, nominally zero. More particularly, referring to FIG. 6 which shows samples $y_k, y_{k+1}, y_{k+2}, y_{k+3}$ of the preamble when OFFSET=0, the wrap-around occurs when the sign of $\hat{y}_k$ or $\hat{y}_{k+1}$ changes (i.e., when $y_k$ passes through the THRESHOLD, here zero. In order to maximize the operating range (i.e. phase locking range of the second feedback loop) when OFFSET=0, a threshold level THRESHOLD, of zero is used in generating $\phi_e$. That is, as noted above, $\phi_e = \hat{y}_k y_{k-1} - \hat{y}_{k-1} y_k$ However, to obtain the desired symmetry (i.e., in order to maximize the locking range of the second feedback loop), it is desirable to have $y_k >$THRESHOLD when:

$y_k = 2\sqrt{2} \sin(3\Pi/4 + \alpha_{FIR} + \Pi/4)$

THRESHOLD$= 2\sqrt{2} \sin(\alpha_{FIR} + \Pi) = -2\sqrt{2} \sin(\alpha_{FIR})$ where $$\alpha_{FIR} = 2\pi\frac{\tau_{FIR}}{4T}$$

Therefore, $$THRESHOLD = -\frac{OFFSET}{2\sqrt{2}}$$

More particularly, and referring in more detail to the preamble phase error calculator section 34 (FIG. 3), it is noted that in response to a START signal, here initial set to a logic 0 when the read head 13 (FIG. 1) is over the initial portion of the preamble, a zero level at the "0" input of selector 50 passes through selector 50 to one input (i.e., input B) of comparator 52. Fed to the other input (A) of the comparator 52 is the output of a flip/flop 51 fed by clock pulses CK to produce $y_k$. (It is noted that here a value of $y_k = 2$ is represented as a logic 1 and a value of $y_k = -2$ is represented as logic 0.) Thus, the output of comparator 52 is $\hat{y}_k$. The output of comparator 52 is fed to a series of here three flip/flops 54, 56 and 58 each fed by the clock pulses CK. Thus, the outputs of flip/flops 54, 56 and 58 are $\hat{y}_{k-1}$, $\hat{y}_{k-2}$, and $\hat{y}_{k-3}$, respectively. The output of comparator 52 is fed to a control input of selector 60. One input (i.e. "1"), of the selector 60 is coupled to the output of flip/flop 51 after a one clock pulse delay produced by flip/flop 62 in response to clock pulses CK. The output of flip/flop 62 is fed to the other input of selector 60 (i.e., input "0") through an inverter 64. Thus, the output of the selector is $-(y_{k-1}\hat{y}_k)/2$.

The output of flip/flop 54 is fed to the control input of selector 68. The output of flip/flop 51 is fed to the "0" input of comparator 68 and to the other input "1" through an inverter 70. The output of selector 68 is $(y_k\hat{y}_{k-2})/2$. The outputs of selectors 60 and 68 are added in adder 74 to produce $-(y_{k-1}\hat{y}_k)/2+(y_k\hat{y}_{k-2})/2$. The output of adder 74 is added to OFFSET/2 in adder 76, to produce (½) $\{(y_{k-1}\hat{y}_k)+(y_k\hat{y}_{k-2})+\text{OFFSET}\}$=(½) $\phi_{e\ PREAMBLE\ ACQ}$. (It is noted that the scale factor a ½ is accounted for in the feedback loop gain.)

It is noted that after three clock pulses CK, the START signal goes from a logic 0 to a logic 1 thereby coupling the output of either negTHRES (i.e, –THRESHOLD) or THRES (i.e., THRESHOLD) to the "1" input of selector 50. negTHRES is fed to the "0" input of selector 61 and THRES is fed to the "1" input of selector 61. The output of selector 61 is fed to the "1" input of selector 50. Thus, when START goes from a logic 0 to a logic 1 after three clock pulses CK, the B input of the comparator 52 will be either: negTHRES, if $\hat{y}_{k-3}$ is logic 1; or, will be THRES, if $\hat{y}_{k-3}$ is logic 0.

Referring in more detail to the data phase error calculator section 32 (FIG. 4), it is first noted that this section 32 is used after the system has locked to the frequency and phase of the preamble. Further, the section 32 will detect ideally, only three sample levels, i.e., +2, 0, and –2. Thus, while in the preamble there are only two valid levels of $y_k$ (i.e., +2 and –2), with actual data there will be ideally three valid levels of $y_k$ (i.e., +2, –2 and 0). Therefore, here $\hat{y}_k$ may be one of three levels which are determined by comparing $y_k$ to +1 and –1.

Thus, if $y_k$ is greater than 1, a logic 1 is produced by comparator 80; whereas, if fed $y_k$ is less than, or equal to, –1, a logic 0 is produced by comparator 80. Further, if $y_k$ is less than –1, comparator 82 produces a logic 1; whereas, if $y_k$ is greater than –1 comparator 82 produces a logic 0. The outputs of the comparators 80, 82 are fed to NOR gate 84. Thus, the output of NOR 84 is gate logic 1 if $y_k$ is greater than –1 and less than, or equal to +1, i.e., if $y_k$ is between +1 and –1 and if $y_k$ is less than –1 and the output of NOR gate 84 is logic 0 if $y_k$ is either greater than +1 or less than –1. It follows then that: if the output of the NOR gate 84 is logic 0 and the output of comparator 82 is logic 1, yk is +2; if the output of the NOR gate 84 is logic 0 and the output of comparator 82 is logic 0, $y_k$ is –2; and, if the output of the NOR gate 84 is logic 0 and the output of comparator 82 is logic 1, $y_k$ is 0. Thus, the three possible levels of $y_k$ are encoded into a two bit word, one bit being at the output of the NOR gate 84 and the other bit being at the output of comparator 82. These two bits are stored in a corresponding pair of flip/flops 86, 88, respectively in response to clock pulses CK. The pair of flip/flops 86, 88 store a two bit representation of $\hat{y}_{k-1}$. The two bit representation of $\hat{y}_{k-1}$ is fed to selectors 90 and 92 and the two bit representation of $\hat{y}_k$ is fed to selectors 94, 96.

The outputs of flip/flops 86, 88 are fed to the control inputs of selectors 92, 90, respectively, and the outputs of NOR gate 84 and comparator 82 are fed to the control inputs of comparators 96, 94 respectively. The sample yk is fed to the "0" inputs of selector 90 while, because of inverter 98, $-y_k$ is fed to the "1" input of selector 90. The output of selector 90 is fed to the "0" input of selector 92 and ground (or a zero level) is fed to the "1" input of selector 92. It is noted that if the output of flip/flop 88 is logic 1, $y_k$ appears at the output of comparator 90 and if the output of flip/flop 88 is logic 0, $-y_k$ appears at the output of comparator 90. Further, if the output of flip/flop 86 is logic 1, the ground or zero level appears at the output of selector 92 whereas if the output of flip/flop 86 is logic 0 the output of comparator 90 appears at the output of comparator 92. Thus, the output of selector 92 is $(y_k\hat{y}_{k-1})/2$.

The sample $y_k$ is fed to a flip/flop 99 which is clocked by the clock pulses CK. Thus, the output of the flip/flop 99 is $y_{k-1}$. The sample $y_{k-1}$ is fed to the "1" input of comparator 94 and, because of inverter 100, $-y_k$ is fed to the "1" input of comparator 94. Thus, when the comparator 82 produces a logic 1, the selector 94 produces $-y_{k-1}$ and when the comparator 82 produces a logic 0, the selector 94 produces $y_{k-1}$. The output of selector 94 is fed to the "0" input of selector 96 and ground, or a zero level, is fed to the "1" of selector 96. Thus, when the NOR gate 84 produces a logic 1, the selector 96 produces the zero level and when the NOR gate produces a logic 0, the output of comparator 94 is coupled to the output of comparator 96. Thus, the output of comparator 96 is $-(y_{k-1}\hat{y}_k)/2$. The outputs of comparators 92 and 94 are added in adder 102 to produce $\phi_{e\ DATA\ RECOVERY}$.

Figure 6:
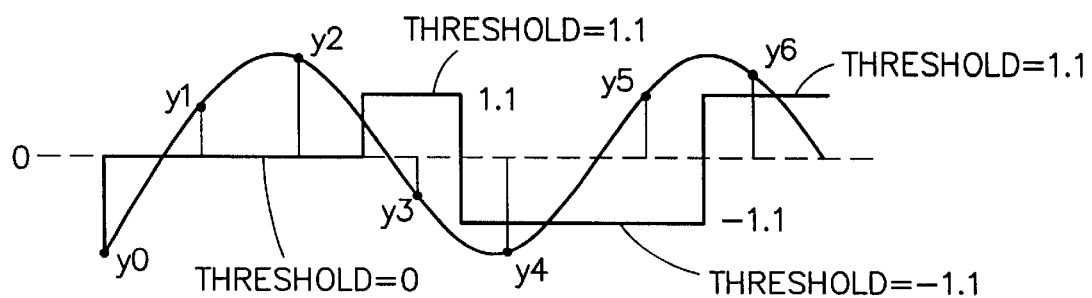
FIG. 6 is a waveform showing changes in a THRESHOLD level for an exemplary series of data samples.

Consider as an example, a case where, because of the OFFSET to be added because of the delay through the asymmetric FIR filter 30 (FIG. 1), the THRESHOLD is –1.1. Thus, THRES=–1.1 and negTHRES=+1.1. Referring to FIG. 6:

$y_0$ is less than zero so that $\hat{y}_0$ is –2;
$y_1$ is greater than zero so that $\hat{y}_1$ is +2;
$y_2$ is greater than zero so that $\hat{y}_2$ is +2.

These were obtained after three clock pulses from after the preamble.

Therefore, for $y_3$, a THRESHOLD of +1.1 is used ($\hat{y}_3$=–2);
for $y_4$, a THRESHOLD of –1.1 is used ($\hat{y}_4$=–2); and
for $y_5$, a THRESHOLD of –1.1 is used ($\hat{y}_5$=+2).

Thus, in general, if $\hat{y}_{k-3}$ was +2, THRESHOLD=1.1 and if $\hat{y}_{k-3}$ was –2, THRESHOLD=+1.1.

The output of the FIR filter 30 is fed to a Viterbi detector, as indicated in FIG. 1.

Other embodiments are within the spirit and scope of the appended claims. Further, the data recovery system may include DC offset compensation described in a co-pending patent application entitled "Data Recovery System Having Offset Compensation" by the same inventors as this patent application, filed the same date as this patent application and assigned to the same assignee as this patent application, the entire subject matter thereof being incorporated herein by reference.

What is claimed is:

1. A data recover system wherein data is represented by a sequence of preamble pulses followed by data pulses, such system, comprising:

an analog to digital converter for converting samples of the preamble pulses and the data pulses into digital words in response to clock pulses fed to a clock input of the converter;

an asymmetric finite impulse response filter fed by an output of the analog to digital converter;

a pair of feedback loops, a selected one thereof being coupled to the output of the analog to digital converter to produce the clock pulses for the converter;

(i) a first one of the feedback looks being operative during a data recovery mode, the first one of the feedback loops including an asymmetric digital filter producing clock pulses during a data recovery mode in accordance with a first phase error signal being related to a phase difference between the clock pulses to the converter and data pulses produced by the asymmetric digital filter, the first one of the feedback loops being adapted to adjust the phase of the clock pulses to the converter in accordance with the first phase error signal to produce a predetermined phase difference between the converted data pulses and the clock pulses;

a second one of the feedback loops being operative during a preceding preamble acquisition mode, the second one of the feedback loops by passing the asymmetric digital filter during a preceding preamble acquisition mode and producing the clock pulses to the converter during the preamble acquisition mode, the second feedback loop producing a second phase error signal related to a phase difference between the clock pulses to the converter and converted preamble pulses produced by the analog to digital converter and an offset phase, between the converted preamble pulses and the clock pulses, the offset phase being related to a phase shift produced by the asymmetric digital filter.

2. A data recovery system wherein data recovered from such system is represented by a sequence of data pulses, such system comprising:

(A) an analog equalization filter fed by a predetermined sequence of preamble pulses during a preamble acquisition mode followed by the sequence of the data pulses during a subsequent data recovery mode, the analog equalization filter being configured to shape the sequence of preamble pulses and data pulses into pulses having a predetermined waveform characteristic, the analog equalization filter having a non-linear change in phase as a function of frequency characteristic;

(B) an analog to digital converter fed by the analog equalization filter for converting samples of the shaped pulses fed thereto into corresponding digital words in response to clock pulses fed to a clock input of the converter;

(C) a pair of feedback loops;
(i) a first one of the loops having an asymmetric digital filter, such first one of the feedback loops being coupled between an output of the analog to digital converter and the clock pulse input to such converter through the asymmetric digital filter during a data recovery mode; and,
(ii) a second one of the loops being coupled between the output of the analog to digital converter and the clock pulse input to such converter with the asymmetric digital filter by-passed, during a preceding preamble recovery mode; and (C) wherein the asymmetric digital filter has coefficients selected to compensate for the non-linear change in phase as a function of frequency characteristic of the equalization filter; and (D) wherein the first feedback loop includes a data phase error calculator section fed by the asymmetric digital filter, such data phase error calculator section being responsive to the digital words fed thereto by the asymmetric digital filter for producing a data recovery mode phase error control signal; and (E) wherein the second one of the feedback loops includes a preamble phase error calculator section responsive to the digital words produced by the analog to digital converter and representative of the preamble pulses and an offset phase shift, determined in accordance with the coefficients of the asymmetric digital filter, for producing a preamble acquisition mode phase error control signal, such preamble acquisition mode phase error control signal being used to control the frequency and phase of the clock pulses to the converter during the preamble acquisition mode and the data recovery mode phase error control signal is used to control the frequency and phase of the clock pulses to the converter during the subsequent data recovery mode.

3. A data recovery system, such data being represented by a sequence of preamble pulses having a predetermined sequence followed by data pulses, such system comprising:

(A) an analog to digital converter fed by a filter for converting samples of the preamble and data pulses into corresponding digital words in response to clock pulses fed to a clock input of the converter; and (B) a pair of feedback loops coupled between an output of the analog to digital converter and the clock pulse input to such converter for producing the clock pulses at the clock input,
(a) a first one of the feedback loops including:
(i) an asymmetric digital filter fed by the digital words produced by the asymmetric digital filter, such asymmetric digital filter having a predetermined phase shift; and
(ii) a data phase error calculator section fed by the asymmetric digital filter and responsive to the digital words representative of the data pulses for producing a first phase error signal; and
(b) a second one of the feedback loops including:
(i) a preamble phase error calculator section responsive to the digital words representative of the preamble pulses and to the predetermined phase shift of the asymmetric digital filter for producing the clock pulses for producing a second phase error signal;
(c) a clock pulse generator system, fed by the second phase error signal during a preamble acquisition mode and by the first phase error signal during a data recovery mode, being the clock pulses for the analog to digital converter during a data recovery mode, for producing the clock pulses, the first and second phase error signals adjusting the phase of the clock pulses to produce a predetermined phase difference between the converted pulses and the clock pulses.

4. A data recovery system, such data being represented by a sequence of data pulses, such system comprising:

(A) an analog filter, fed by a predetermined sequence of preamble pulses during a preamble acquisition mode followed by the sequence of data pulses during a subsequent data recovery mode, for shaping the sequence of preamble and data pulses into pulses having a predetermined characteristic, such analog filter having a non-linear change in phase as a function of frequency;

(B) an analog to digital converter fed by the filter for converting samples of the shaped pulses fed thereto into corresponding digital words in response to clock pulses fed to a clock input of the converter; and (C) a pair of feedback loops coupled between an output of the analog to digital converter and the clock pulse input to such converter, (a) a first one of the feedback loops including:
  (i) an asymmetric digital filter fed by the digital words produced by the analog to digital filter, such asymmetric digital filter having coefficients selected to compensate for the non-linear change in phase as a function of frequency of the analog filter; and
  (ii) a data phase error calculator section fed by the asymmetric digital filter and responsive to the digital words representative of the data pulses for producing the clock pulses for the analog to digital converter during the data recovery mode; and
(b) a second one of the feedback loops including:
  (i) a preamble phase error calculator section responsive to the digital words representative of the preamble pulses and to the time delay determined in accordance with the coefficients of the asymmetric digital filter for producing the clock pulses for the converter during the preamble acquisition mode.

5. The data recovery system of claim 1, further comprising an analog filter, fed by a predetermined sequence of preamble pulses during a preamble acquisition mode followed by a sequence of data pulses during a subsequent data recover mode, for shaping the sequence of preamble and data pulses into pulses having a predetermined characteristic, such analog filter having a non-linear change in phase as a function of frequency.

6. The data recovery system of claim 5, wherein the asymmetric finite impulse response filter has coefficients selected to compensate for the non-linear change in phase as a function of a frequency characteristic of the analog filter.

7. The data recovery system of claim 6, wherein the data recovery system further comprises DC offset compensation.

8. The data recovery system of claim 2, wherein the asymmetric digital filter is a finite impulse response filter.

9. The data recovery system of claim 8, wherein the data recovery system further comprises DC offset compensation.

10. The data recovery system of claim 3, further comprising an analog filter, fed by a predetermined sequence of preamble pulses during a preamble acquisition mode followed by a sequence of data pulses during a subsequent data recover mode, for shaping the sequence of preamble and data pulses into pulses having a predetermined characteristic, such analog filter having a non-linear change in a phase as a function of frequency.

11. The data recovery system of claim 10, wherein the asymmetric finite impulse response filter has coefficients selected to compensate for the non-linear change in phase as a function of a frequency characteristic of the analog filter.

12. The data recovery system of claim 11, wherein the data recovery system further comprises DC offset compensation.

13. The data recovery system of claim 4, wherein the asymmetric digital filter is a finite impulse response filter.

14. The data recovery system of claim 13, wherein the data recovery system further comprises DC offset compensation.

* * * * *